United States Patent [19]
Krenn

[11] Patent Number: 5,499,472
[45] Date of Patent: Mar. 19, 1996

[54] RECOVERABLE FISHING SINKER

[76] Inventor: Henry J. Krenn, 2545 Solano Rd., Shell Beach, Calif. 93449

[21] Appl. No.: 426,578

[22] Filed: Apr. 21, 1995

[51] Int. Cl.⁶ .................................................... A01K 95/00
[52] U.S. Cl. ........................................... 43/44.97; 43/43.1
[58] Field of Search .................................. 43/43.1, 44.9, 43/44.97, 44.96, 43.12, 44.89, 44.93, 44.92

[56] References Cited

U.S. PATENT DOCUMENTS

| 2,983,067 | 5/1961 | Saywell | 43/44.9 X |
| 3,468,053 | 9/1969 | Lux | 43/44.96 X |
| 3,744,177 | 7/1973 | Cron, Jr. | 43/43.12 |
| 4,821,449 | 4/1989 | Hafer | 43/44.97 X |

FOREIGN PATENT DOCUMENTS

| 286106 | 9/1968 | Australia | 43/43.12 |

Primary Examiner—P. Austin Bradley
Assistant Examiner—Jeanne M. Elpel
Attorney, Agent, or Firm—Daniel C. McKown

[57] ABSTRACT

A snag-resistant wholly recoverable sinker for the distal end of a fishing line includes a bag into which a plurality of beads strung on a line are placed, the end of the line being attached to the lip of the bag, and the mouth of the bag being elastically constricted by a resilient collar. The diameter of the first bead at the proximal end of the string of beads is greater than the diameter of any of the remaining beads. When the bag becomes snagged, the fisherman has only to pull hard enough on the line to draw the larger first bead through the mouth of the bag against the resistance of the resilient collar after which the smaller beads follow thereby reducing the size of the bag until it is freed. In an extreme case, all the beads will be pulled from the bag, and they will be followed by the empty bag to which the distal end of the line is attached. Significantly, no parts of the sinker are lost in the process of freeing it, and the sinker may be reeled in and reassembled by the fisherman for reuse.

10 Claims, 1 Drawing Sheet

RECOVERABLE FISHING SINKER

BACKGROUND OF THE INVENTION

1. Field of the Invention

The present invention is in the field of fishing apparatus and more specifically relates to a sinker, the structure of which permits it to be freed and recovered after it has become snagged on underwater objects.

2. The Prior Art

Typically, a weight is attached to the distal end of a fishing line, either to enhance the distance it can be cast from the fisherman or to anchor the end of the line to the bottom. As the sinker moves along the bottom, it runs the risk of becoming snagged on or between rocks or other objects on the bottom. When this occurs, the fisherman has little choice but to pull on the line, hoping thereby to free the sinker. In many cases, before sufficient force can be applied to free the sinker, the line breaks, and the sinker is lost.

A number of inventors have addressed the problem of designing a sinker that is less likely to become snagged or that is easily released from the line after it has become snagged. A few of these efforts will now be described.

In U.S. Pat. No. 5,243,779 issued Sep. 14, 1993, Reed discloses a sinker that is supple and that is formed by placing steel-shot into a woven sleeve. The steel shot are not strung on a line, and the sleeve is closed at both ends. The diameter of the sleeve is small enough to keep the shot in a single file, but large enough to impart a high degree of flexibility.

In U.S. Pat. No. 5,088,228 issued Feb. 18, 1992, Waldie, Jr., describes an elastomeric retainer that pulls through a snagged toroid-shaped weight. The weight is left behind and lost.

In U.S. Pat. No. 4,467,550 issued Aug. 28, 1984, Haulk describes a sinker that includes an egg-shaped weight having a bore that extends through it. A wire runs through the bore and is bent sufficiently to retain the weight. The force required to free the wire from the snagged weight is less than the force required to break the line.

In Australian Patent No. 286,106, Cameron describes a sinker in the form of a bag into which one can load an amount of shot appropriate to the prevailing conditions. The shot remains loose within the bag.

In U.S. Pat. No. 4,077,151 issued Mar. 7, 1978, Johnson discloses a bag partly filled with sand and having a weakened upper portion that tears to release the line.

In U.S. Pat. No. 3,648,398 Newell discloses a sinker having an eye to which the line is attached, having a flexible tubular section, and having a cylindrical weight that is plugged into the distal end of the tubular section. The weight is lost when it becomes necessary to free a snagged sinker.

In U.S. Pat. No. 2,985,981 issued May 30, 1961, King discloses a sack in which an egg-shaped weight is located along with sufficient water to submerge the weight. The weight does not leave the sack. The flexibility of the sack is relied upon to prevent snagging.

The above patents may be placed into groups. The first group consists of sinkers that have a supple or flexible structure which, it is asserted, prevents them from becoming snagged. However, if they do become snagged, the sinkers offer no particular advantage. In the second group, the snagged sinker separates and part of it is left behind.

The present invention falls into a class by itself because, once it has become snagged, the entire sinker can be recovered and reused.

SUMMARY OF THE INVENTION

In accordance with the present invention, a number of small weights having the form of beads are strung onto the line adjacent its distal end. The distal end is then attached to the lip of a nylon bag. The weights are then enclosed within the bag, and the mouth of the bag is elastically constricted by an external rubber collar. The last of the beads to go into the bag has a larger diameter than any of the other beads. If the sinker becomes snagged, the fisherman can pull on the line in an attempt to free the sinker. However, before the tension becomes sufficient to break the line, the last (largest) bead will be pulled through the elastically-constricted mouth of the bag, and further pulling will result in the remaining beads being drawn from the bag. This reduces the size of the bag and is likely to free the bag. With further pulling on the line, all of the remaining beads are pulled from the bag and is very likely that the empty bag will be freed. The crucial thing to note is that neither the bag nor the beads are lost, and the line is not broken. Thereafter, the line is reeled in, and the beads are replaced in the nylon bag. The external rubber collar is replaced around the mouth of the nylon bag, and the sinker is then ready to be used again.

In addition to providing a sinker that is snag-resistant and entirely recoverable, the present invention provides other advantages. Compared with solid fishing weights, the sinker of the present invention is less rigid and consequently less likely to cause injury in the event the sinker is dropped on someone's foot or swung into someone's face. Also, for the same reason, the sinker of the present invention is less likely to scratch or to dent the boat.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
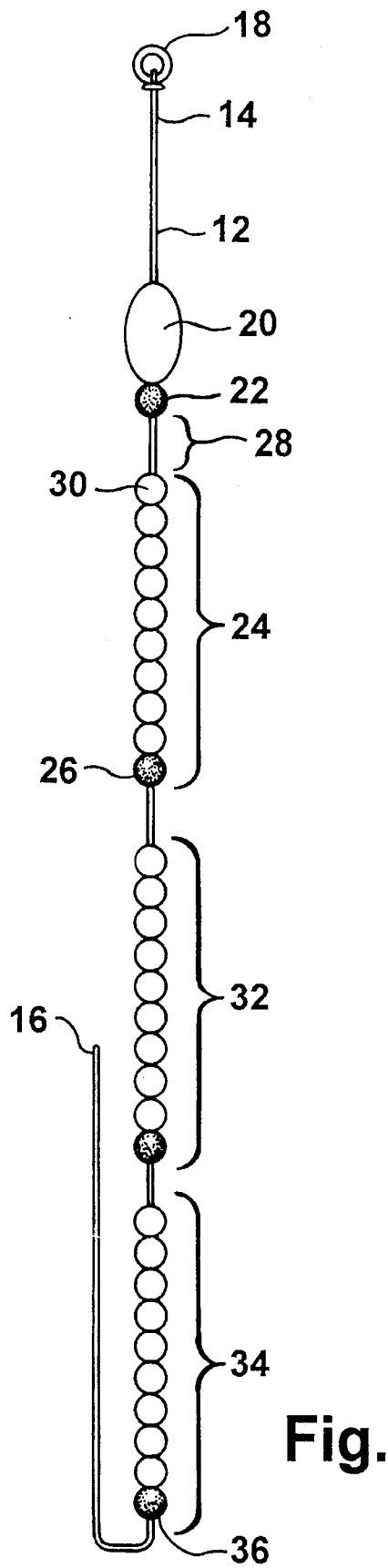
FIG. 1 is a diagram showing the sequence in which a number of beads, which serve as weights, are strung onto a line; and, FIG. 2 is a side elevational cross sectional view of a sinker in accordance with a preferred embodiment of the present invention.
Figure 2:
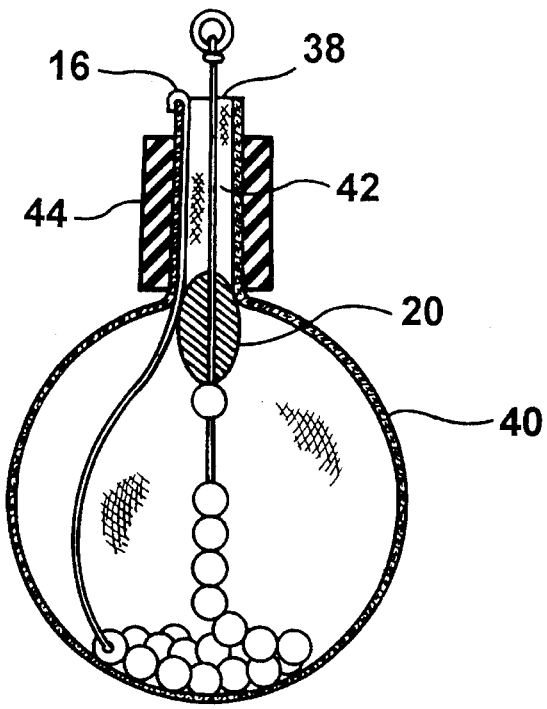

FIG. 1 is a diagram showing how a number of beads are strung on a line 12 in the preferred embodiment of the present invention. In the preferred embodiment, the line is composed of linen and has a proximal end 14 and a distal end 16. In the preferred embodiment, the proximal end 14 is connected to an eyelet 18 that permits the sinker to be removably connected to a much longer line that extends back to the fisherman; however, in an alternative embodiment the eyelet 18 may be omitted and the line 12 may extend all the way back to the fisherman.

In the preferred embodiment, the beads are composed of lead, but in alternative embodiments the beads may be composed of other materials such as steel.

It is important for the present invention that the first bead 20 must have an elongated and rounded shape and that its elongated direction should coincide with the direction of the line 12. The shape of the remaining beads is not critical, and they may be spherical or elongated. It is critical for the present invention that the remaining beads should be smaller in diameter, measured perpendicular to the line 12, than the first bead 20.

The distal end 16 is threaded through the first bead 20 which thereafter is drawn along the line towards the proximal end 14. In the preferred embodiment, a second bead 22 is then threaded onto the line from the distal end 16 and drawn up against the first bead 20. The second bead 22 is then crimped onto the line. In an alternative embodiment, the second bead 22 is omitted, and the first bead 20 is crimped onto the line.

Next, a first group 24 of beads is threaded onto the line and the last bead 26 of the group is crimped to the line. In the preferred embodiment, a space 28 equal to the length of two beads is left between the second bead 22 and the first bead 30 of the first group 24.

Thereafter, additional groups of approximately 10 beads, such as the groups 32 and 34, are added to the string, and in the preferred embodiment a space of approximately the length of two beads is included between successive groups. The last bead in each group is crimped to the line. In FIG. 1, the crimped beads are shaded. A length of line should be left between the last bead 36 of the last group 34 and the distal end 16. For reasons which will become clear below, the spaces between the groups of beads are provided for the purpose of imparting flexibility to the string of beads in the preferred embodiment. In less preferred embodiments, all of the beads beyond the space 28 could be strung without spaces, but some flexibility would be lost.

After the beads have been strung on the line 12 in the manner shown in FIG. 1, the distal end 16 is attached to the lip 38 of a bag 40. In an alternative embodiment, the distal end 16 is affixed to the inside bottom of the bag.

In the preferred embodiment, the bag 40 is composed of nylon cloth, but in alternative embodiments other materials such as plastic film may be used. It is highly desirable that the material of the bag be slippery or slick when wet.

The strung beads are inserted through the mouth 42 of the bag 40, including the first bead 20.

Next, with the first bead 20 well within the bag 40, the mouth portion 42 of the bag is drawn through a resilient collar 44. The resilient collar 44 elastically constricts the mouth of the bag sufficiently that the first bead 20 cannot be pulled out of the bag by the forces ordinarily encountered in handling and using the sinker.

If the bag 40 becomes snagged while in use, the fisherman needs only to pull harder on the line, whereby the first bead 20 is able to overcome the resistance of the resilient collar 44 and to be drawn out of the mouth 42 of the bag. The remaining beads, because of their smaller diameter, will easily be pulled out of the mouth of the bag until the size of the bag has been reduced sufficiently to free it or until all of the beads have been pulled from the bag and the empty bag becomes free.

Significantly, no part of the sinker is lost in the process. This permits the fisherman to reel in the sinker and to replace the beads into the bag as described above, thereby rendering the sinker ready for use again.

In the preferred embodiment, the resilient collar 44 is a short length of rubber tubing and is composed of a synthetic rubber.

Thus, there has been described a snag-resistant wholly recoverable sinker for the distal end of a line used for fishing. Although a preferred embodiment has been described in some detail, it can be appreciated that numerous variations are possible within the scope and spirit of the invention recited in the following claims.

What is claimed is:

1. A snag-resistant wholly recoverable sinker for a distal end of a line used for fishing, comprising:

a bag having a mouth;

a plurality of beads strung onto a portion of the line adjacent the distal end of the line, the first bead strung having a larger diameter than the succeeding beads, the first bead strung being crimped to the line and the last bead strung being crimped to the line;

said bag enclosing said plurality of beads; and, a resilient collar affixed to said bag, encircling and elastically constricting the mouth of said bag and preventing said first bead from being withdrawn from said bag until a predetermined tension in the line is exceeded, said predetermined tension being less than the tension required to break the line;

the distal end of the line affixed to said bag.

2. The sinker of claim 1 wherein said plurality of beads includes spaced groups of beads, the last bead in each group being crimped to the line.

3. The sinker of claim 1 wherein said bag is made of a fabric.

4. The sinker of claim 3 wherein said fabric is nylon.

5. The sinker of claim 1 wherein said resilient collar is composed of rubber.

6. A snag-resistant wholly recoverable sinker for a distal end of a line used for fishing, comprising:

a bag having a mouth;

a plurality of beads strung onto a portion of the line adjacent the distal end of the line, the first bead strung having a larger diameter than the succeeding beads, the second bead strung being crimped to the line and the last bead strung being crimped to the line;

said bag enclosing said plurality of beads; and, a resilient collar affixed to said bag, encircling and elastically constricting the mouth of said bag and preventing said first bead from being withdrawn from said bag until a predetermined tension in the line is exceeded, said predetermined tension being less than the tension required to break the line;

the distal end of the line affixed to said bag.

7. The sinker of claim 6 wherein said plurality of beads includes spaced groups of beads, the last bead in each group being crimped to the line.

8. The sinker of claim 6 wherein said bag is made of a fabric.

9. The sinker of claim 8 wherein said fabric is nylon.

10. The sinker of claim 6 wherein said resilient collar is composed of rubber.

* * * * *